April 22, 1924.
C. T. WESTLAKE ET AL
RAILWAY MOTOR CAR
Filed Aug. 10, 1922   2 Sheets-Sheet 1
1,491,181
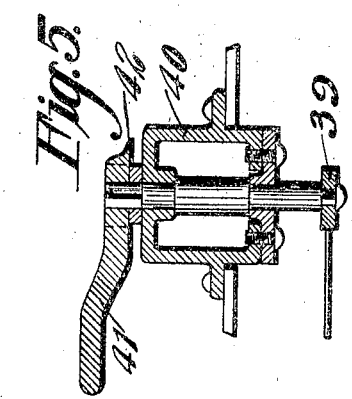
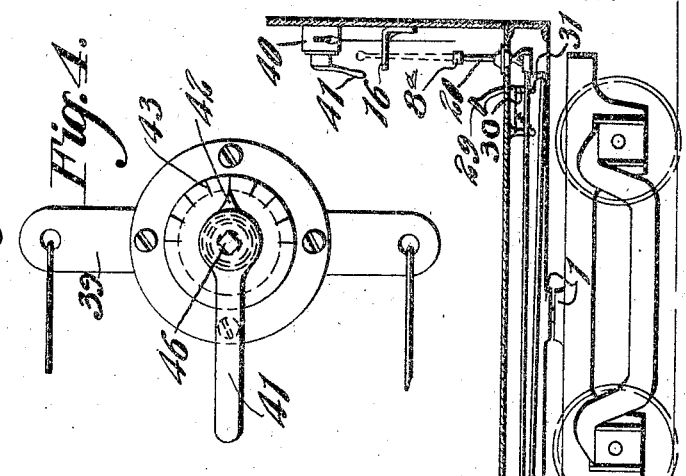
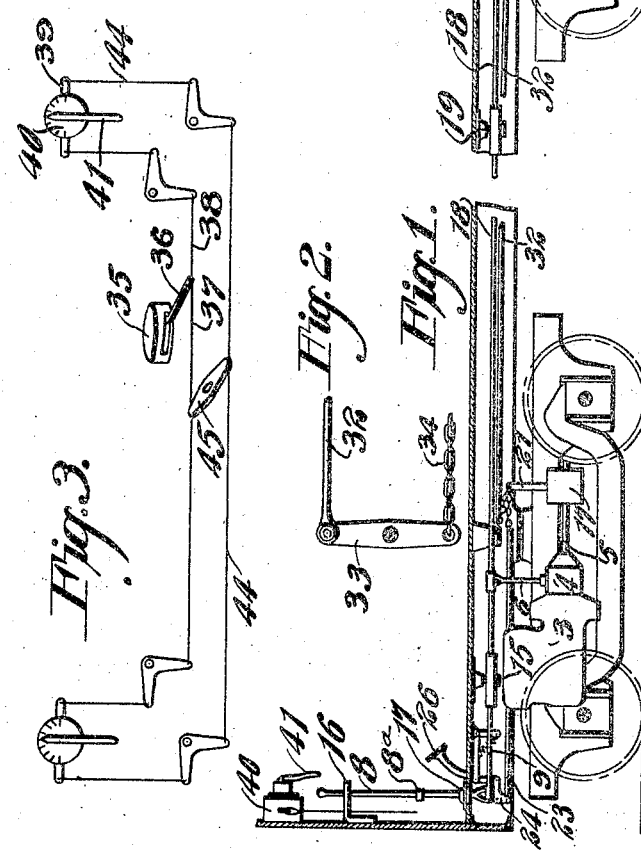
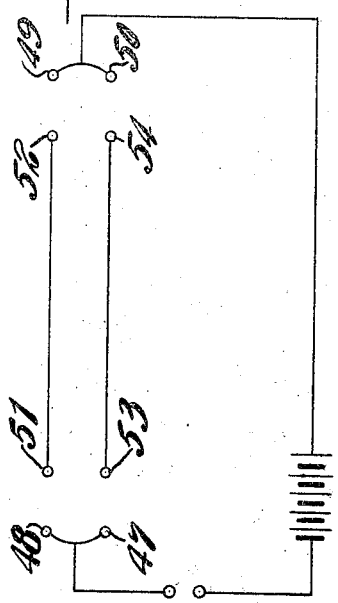
Inventors.
CHARLES T. WESTLAKE.
HARRY M. PFLAGER.

April 22, 1924.
C. T. WESTLAKE ET AL
1,491,181
RAILWAY MOTOR CAR
Filed Aug. 10, 1922  2 Sheets-Sheet 2
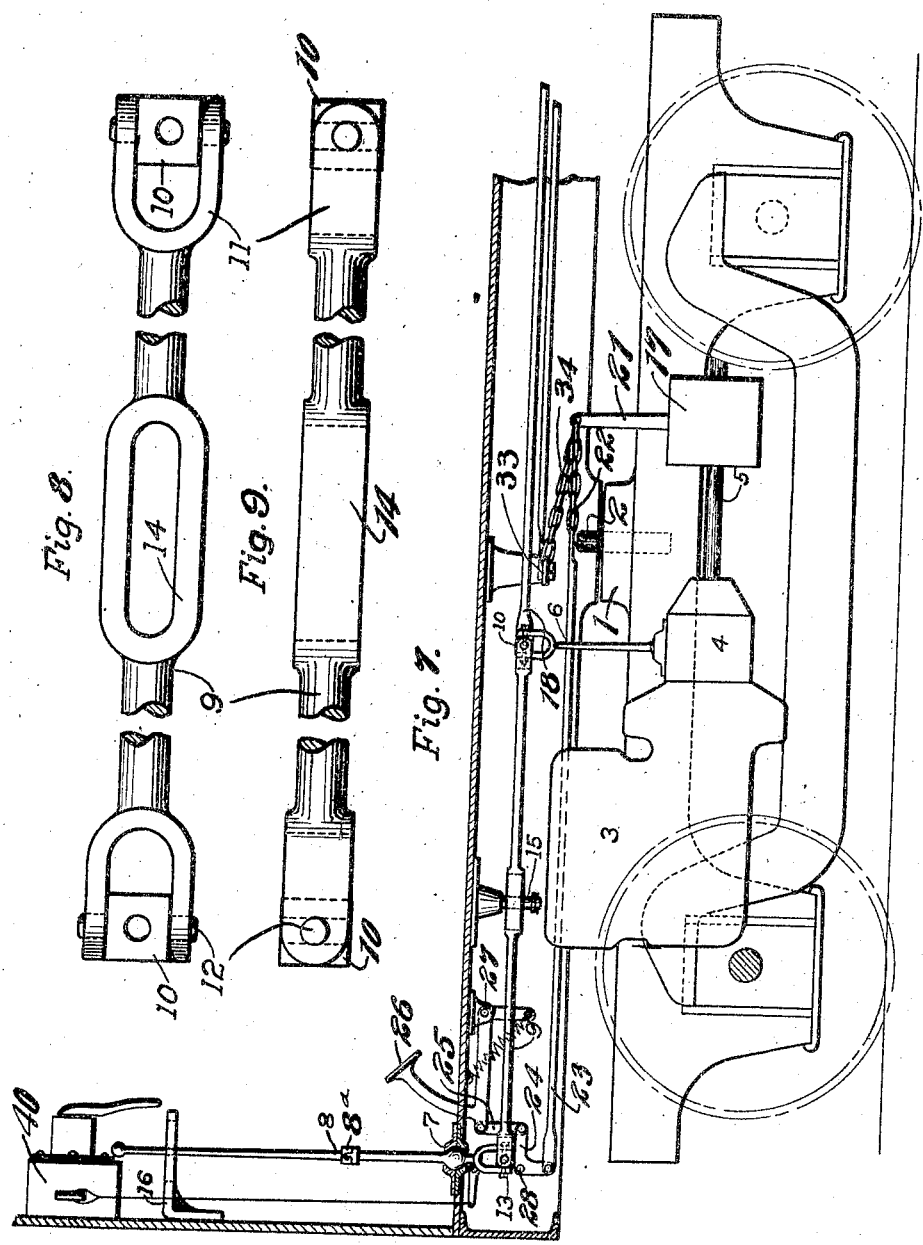
Inventors.
Charles T. Westlake.
HARRY M. PFLAGER.
By J. B. Cornwall
Atty Patented Apr. 22, 1924.

1,491,181

UNITED STATES PATENT OFFICE.

CHARLES T. WESTLAKE AND HARRY M. PFLAGER, OF ST. LOUIS, MISSOURI, ASSIGNORS TO COMMONWEALTH STEEL COMPANY, OF ST. LOUIS, MISSOURI, A CORPORATION OF NEW JERSEY.

RAILWAY MOTOR CAR.

Application filed August 10, 1922. Serial No. 580,940.

*To all whom it may concern:*

Be it known that we, CHARLES T. WESTLAKE and HARRY M. PFLAGER, citizens of the United States, residing at St. Louis, Missouri, have invented a certain new and useful Improvement in Railway Motor Cars, of which the following is a full, clear, and exact description, such as will enable others skilled in the art to which it appertains to make and use the same, reference being had to the accompanying drawings, forming part of this specification.

Our invention relates to railway rolling stock and consists in a gear shifting device, clutch mechanism, and spark and gas controls for railroad motor cars in which the motor is carried upon the car truck and is controlled by an operator in the car body.

Like ordinary railroad cars, motor cars are mounted upon swiveling trucks and the motor, preferably positioned on the truck, must be located at some other point than the center of the truck. It is not usually convenient to locate the motor control mechanism immediately above the motor and consequently the relative movement between that portion of the car where the control mechanism is located and that portion of the truck where the motor is located creates a problem in the control of the motor, the solution of which is the object of our present invention.

In the accompanying drawings, which illustrate a selected embodiment of our invention,—

Figure 1 is a longitudinal section through a car body and conventionally illustrates the car truck provided with an internal combustion motor and the car body upon which the motor control apparatus is mounted.

Figure 2 is a fragmentary top view of parts shown in Figure 1.

Figure 3 is a diagrammatic view of the spark control mechanism.

Figures 4 and 5 are, respectively, front view and section of the spark throttle.

Figure 6 is a diagram of the ignition wiring.

Figure 7 is an enlarged section corresponding to one end of Figure 1.

Figures 8 and 9 are, respectively, top and side views of the gear shifting rod shown in Figure 7.

Figure 10 is a top view of a positioning plate for the gear shift control rod.

The body and truck are pivotally assembled at the center plates 1 by the usual king pin 2 and the car body extends forward of the center plates for a substantial distance. Located on the truck frame in front of the center plates is the internal combustion engine 3 provided with ordinary shifting gears which are not shown but which it will be understood are enclosed in a casing 4 and are connected, through a drive shaft 5 and a friction clutch in a housing 17, to the driving wheels of the truck. A gear shift level 6 extends upwardly from the gears in casing 4 and operates to throw the driving mechanism into neutral position or into high, low, intermediate or reverse gear as does the usual gear shift lever on an automobile.

Mounted on the floor of the car near the front end thereof by means of a ball and socket universal joint 7 is a control rod 8 which extends below the car floor and at its lower end is pivotally connected to lever 6 by means of a horizontal lever 9. The horizontal lever connections to rod 8 and lever 6 are universal joints here illustrated as consisting of blocks 10, pivotally assembled with the jaws 11 of lever 9 by means of horizontal pins 12 disposed transversely of lever 9, and each adapted to be pivotally connected to lever 6 or rod 8, respectively, by similar pins 13 disposed longitudinally of lever 9.

Lever 9 intermediate its ends is provided with a slotted portion 14 which slips over a pin 15 extending downwardly from the bottom of the car floor, the lever being retained on the pin by any ordinary collar and cotter pin arrangement as indicated.

The upper end of rod 8 projects through a positioning plate 16 mounted upon the car wall and provided with an H-shaped slot in which the upper end of the rod may be guided to five different positions corresponding to neutral, low, intermediate, high, and reverse positions of the gear shift lever 6. Obviously any longitudinal or transverse movement of the handle of the control rod will be transmitted through the universal joint connections on lever 9 to lever 6 and the motor gears will be shifted accordingly. The pin and slot mounting of lever 9 on the car body permits free longitudinal movement of the lever relative to the body or truck as imparted thereto by the control rod.

The mounting of lever 9 just described is the same as the mounting of lever 18 extending in the opposite direction from lever 6 and pivoted to the car body at 19. At its end lever 18 is provided with a control rod 20 similar to rod 8. Rods 8 and 20 are preferably formed in two parts, the upper part being easily detachable from the lower portion by means of a bayonet joint 8ª illustrated in Figure 7, or otherwise, and it will be found desirable to provide a single upper portion to be used with either rods 8 and 20. Hence either of these rods may be operated independently of the other and when the single upper portion is being used at one end of the car, obviously there cannot be a locking of the gears in one position due to the holding of the rod in the other end of the car by its positioning plate 16.

The clutch contained in housing 17 is released by a single movement in one direction only. The clutch lever 21 is connected to an operating pedal 26 at one end of the car by means of a short chain 22, a pull rod 23, a bell crank 24 and a link 25. The operating pedal is pivoted to the floor of the car at 27 and bell crank 24 is pivoted to the car framing at 28. A similar operating pedal 29 is provided at the opposite end of the car and is connected to the clutch lever 21 by a link 30, bell crank 31, a pull rod 32, lever 33 and chain 34, the introduction of lever 33 being for the purpose of reversing the direction of the pull exerted on rod 32.

In Figure 3, 35 represents an ignition timer which may be positioned upon the motor or at any suitable point and it will be understood that it is connected by wiring to the battery or magneto and to the spark plugs in the engine. A lever 36 projects from the timer and wires 37 and 38 lead in opposite directions from lever 36 to the ends of the car where each is secured to one end of a strap 39 pivotally mounted upon a box 40 secured to the car wall. Strap 39 is rotated by a handle 41 provided with an indicator 42 adapted to cooperate with notches 43 upon box 40 to determine the position of the timer points. A wire 44 connects the other ends of straps 39. A lever 45, having a fixed pivot on the car frame and having its ends secured to wires 37 and 44 completes the timer control mechanism and by reference to Figure 3 it will be seen how operation of the spark control by the throttle at one end of the car similarly changes the setting of the indicator at the opposite end of the car.

Preferably handle 41 will be removable from the shaft 46 upon which it is mounted and only one handle will be provided for the car, the operator carrying the handle with him when he moves from one end of the car to the other similarly to the transfer of the upper portion of rods 8 and 20.

The fuel supply may be controlled by a similar mechanism, but such is not illustrated as it may be substantially a duplication of the elements shown in Figure 3 with the substitution of a carbureter for timer 35. The fuel throttles would be positioned on the car wall adjacent to the spark throttles 40.

By means of the switch arrangement shown in the wiring diagram of Figure 6, the ignition circuit may be opened or closed at either end of the car. The poles 47 and 48 of the lefthand switch are both connected to the ignition circuit as are the poles 49 and 50 of the righthand switch. Pole 51 of the lefthand switch is connected to pole 52 of the righthand switch and poles 53 and 54 are similarly connected. With the blade of the lefthand switch connecting poles 47 and 51, the operator, stationed at the righthand switch, may complete the circuit by connecting poles 50 and 52 or may open the circuit by connecting poles 49 and 54. If he does the latter and leaves the circuit open and subsequently desires to operate the car from the lefthand switch, he may do so by connecting poles 48 and 53. In other words, irrespective of the setting of the remote switch, the circuit may be opened and closed in one-quarter turn of the control knob of the near switch.

The above described construction permits substantial movement of the front end of the car transversely of the truck without affecting the gears, clutch, ignition or fuel throttles. Any movement of lever 9 resulting from such movement of the car body will, like the car body movement, be about king pin 2. Consequently the rear end of lever 9 moves transversely of the truck such a slight distance that it can easily be accommodated in the universal joint connecting lever 9 and lever 6. This condition remains the same irrespective of the forward extension of the car body and lever 9.

Chains 22 and 34 form lost motion devices which similarly accommodate any transverse movement of the clutch lever 21 relative to the car body and also permit independent operation of the clutch pedals. The fuel and ignition lines are not shown connected to the engine as it is obvious that they may be flexible and therefore easily adapted to the relative movement of the trucks and car body.

Obviously many details of the construction shown may be changed without departing from the spirit of our invention and we contemplate the use of all such modifications as may arise in the commercial development of our invention.

We claim as our invention:

1. In combination, a railway car truck, a body pivotally mounted thereon, a motor on said truck, selective lever-operated shifting gears for said motor on said truck, and a gear shift lever control on said body.

2. In combination, a railway car truck, a body pivotally mounted thereon, motor shifting gears on said truck controlled by a lever which has movement longitudinally and transversely of the truck, and means positioned on the car body at a point spaced from its pivotal mounting for moving the control lever as desired.

3. In a railway motor car, motor shifting gears mounted on the car truck, a lever for shifting said gears, a control rod pivotally mounted on the car body at a point spaced from said member, and a member pivotally connected to said shift lever and said rod and pivoted between its ends.

4. In a railway motor car, motor shifting gears mounted on the car truck, a lever for shifting said gears, a control rod pivotally mounted on the car body at a point spaced from said lever, and a member pivotally connected to said shift lever and said rod and slidably pivoted between its ends to the car body.

5. In a railway motor car, motor shifting gears mounted on the car truck, a lever for shifting said gears, a control rod mounted on the car body by a universal joint, a member pivotally connected to said lever and rod at its opposite ends respectively, and a pin and slot mounting for said member on the car body.

6. In a railway motor car, motor shifting gears mounted on the car truck, a vertical lever for shifting said gears, a vertical control rod mounted between its ends on the floor of the car body by a ball and socket joint, positioning means for said lever above the body floor, a lever connecting said shift lever and the lower end of said rod by means of universal joints and slotted intermediate its ends, and a fixed point projecting downwardly from the body floor and through the slot in said lever.

7. In a railway motor car, motor shifting gears mounted on the car truck, a lever for shifting said gears, control rods pivotally mounted on the car body at points spaced from said gear shift lever and each other, and members pivotally connected at their opposite ends to said shift lever and to said rods and slidably pivoted between their respective ends to the car body, and a detachable operating extension for said rods adapted to be used with either of them.

8. In combination, a railway car truck, a body pivotally mounted thereon, an internal combustion engine on said truck, and means operable from the car body for advancing and retarding the engine ignition spark.

9. In combination, a railway car truck, a body pivotally mounted thereon, an internal combustion engine mounted on said truck, a gear shifting device including a gear shift lever having selective longitudinal and lateral movements, and a clutch device on the truck connecting said engine to the truck wheels, and means for controlling the operation of said devices from the car body.

10. In combination, a railway car truck, a body pivotally mounted thereon, an internal combustion engine mounted on said truck, a gear shifting device including a gear shift lever having selective longitudinal and lateral movements, and a clutch device on the truck connecting said engine to the truck wheels, and means operable from either end of the car body for controlling said devices.

11. In combination, a railway car truck, a body pivotally mounted thereon, an internal combustion engine on said truck, a clutch connecting said engine and the truck wheels, clutch operating members mounted on the car body, extending to opposite ends thereof and including lost motion means whereby the clutch operating member extending to one end of the car may be operated independently of the member extending to the opposite end of the car.

12. In combination, a railway car truck, an internal combustion engine mounted thereon, a car body pivotally mounted on said truck, a gear shift and clutch on the truck connecting said engine and the truck wheels, an ignition circuit, an adjustable ignition timer, and separate means operable from either end of the car for controlling said gear shift, clutch, circuit, and timer.

In testimony whereof we hereunto affix our signatures this 4th day of Aug., 1922.

C. T. WESTLAKE.
H. M. PFLAGER.